United States Patent
Jones, Jr.

(10) Patent No.: US 7,247,352 B2
(45) Date of Patent: *Jul. 24, 2007

(54) METHOD FOR MANUFACTURING A CARPET WITH IMPROVED LIQUID BARRIER PROPERTIES

(75) Inventor: Dennis J. Jones, Jr., Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/469,199

(22) Filed: Aug. 31, 2006

(65) Prior Publication Data

US 2007/0000106 A1    Jan. 4, 2007

Related U.S. Application Data

(63) Continuation of application No. 10/133,449, filed on Apr. 29, 2002, now Pat. No. 7,157,121.

(51) Int. Cl.
| | | |
|---|---|---|
| *B05D 7/00* | (2006.01) | |
| *B05D 1/36* | (2006.01) | |
| *B05D 3/00* | (2006.01) | |
| B05D 1/18 | (2006.01) | |
| B05D 1/28 | (2006.01) | |
| A47G 27/02 | (2006.01) | |

(52) U.S. Cl. .................. 427/412; 427/209; 427/389.9; 427/394

(58) Field of Classification Search ............... None
See application file for complete search history.

(56) References Cited

U.S. PATENT DOCUMENTS

| | | | |
|---|---|---|---|
| 4,579,762 A | 4/1986 | Ucci | |
| 4,619,853 A | 10/1986 | Blyth et al. | |
| 4,643,930 A * | 2/1987 | Ucci | 428/96 |
| 4,822,373 A | 4/1989 | Olson et al. | |
| 4,937,123 A | 6/1990 | Chang et al. | |
| 5,084,306 A | 1/1992 | McLellan et al. | |
| 5,219,620 A | 6/1993 | Potter et al. | |
| 5,366,161 A | 11/1994 | Potter et al. | |
| 5,520,962 A * | 5/1996 | Jones, Jr. | 427/393.4 |
| 5,558,916 A | 9/1996 | Heim et al. | |
| 5,612,113 A | 3/1997 | Irwin, Sr. | |
| 5,714,224 A | 2/1998 | Gerry | |
| 5,851,595 A * | 12/1998 | Jones, Jr. | 427/393.4 |
| 5,853,814 A | 12/1998 | Murphy | |
| 5,908,663 A | 6/1999 | Wang et al. | |
| 5,948,480 A | 9/1999 | Murphy | |

* cited by examiner

*Primary Examiner*—William Phillip Fletcher, III
(74) *Attorney, Agent, or Firm*—Jason A. Bernstein; Powell Goldstein LLP

(57) ABSTRACT

A method of producing carpet having the steps of: providing a carpet having a pile side formed from yarn fibers projecting through a primary backing layer, and an underside region comprising back stitch yarn fibers and the primary backing layer; applying effective repellency enhancing amounts of a first repellency enhancing compound to the pile side; applying a liquid repellency enhancing compound to the underside region to provide improved liquid barrier properties in the region; and applying separately a coating or latex layer to the underside region.

20 Claims, 1 Drawing Sheet

METHOD FOR MANUFACTURING A CARPET WITH IMPROVED LIQUID BARRIER PROPERTIES

CROSS-REFERENCE TO RELATED APPLICATIONS

This application is a continuation of application Ser. No. 10/133,449, filed Apr. 29, 2002, now U.S. Pat. No. 7,157,121, the disclosure of which is incorporated by reference in its entirety herein.

BACKGROUND OF THE INVENTION

1. Field of the Invention

The present invention relates to the field of carpet and the manufacture thereof, and more particularly relates to methods of treating carpet to enhance its liquid barrier properties. The invention also relates to carpets with improved liquid barrier properties.

2. Description of Related Art

The majority of carpet is constructed in the following general manner. Carpet pile yarn is first inserted through a primary backing fabric to form tufts of yarn projecting from the surface of the primary fabric. This side is known as the pile side. Backstitches of the yarn protrude through the opposite side of the primary backing to hold the yarn in place. This side is referred to as the underside or back stitch side. The primary backing thus is perforated with many holes during this tufting operation. The carpet is then dyed. Then a coating layer is applied to the underside of the primary backing layer. The coating layer usually includes polymeric latex to lock the yarn tufts in place and to provide an adhesive for a secondary backing fabric. The latex-coated primary backing is then bonded to the secondary backing to form a laminated backing structure.

Additional steps have been added to the process to attempt to enhance repellency and stain resistance of the carpet. For example, it is now a common practice to topically apply to the pile side of the carpet a compound from the class of chemicals known as fluorochemicals. The purpose of applying such fluorochemicals is to reduce the tendency of soil, oil and/or water to adhere to the carpet fibers. It is also a common practice to apply a stain resist compound to carpet, generally nylon carpet, to make the nylon carpet fibers resistant to staining, particularly by anionic or "acid" dyes.

Generally, fluorochemicals are topically applied to carpet after the dyeing step. One conventional method of application is to form an aqueous dispersion of the fluorochemical and then spray that dispersion on the top face (pile side) of the carpet. Another method is to make aqueous-based foam containing the fluorochemical and then apply the foam to the top face of the carpet. See, e.g., U.S. Pat. No. 5,853,814. In both methods, heat is usually applied to drive off excess water and to fix the fluorochemical to the carpet fibers.

Typically, stain resist compounds are applied to carpet from a bath after the dyeing step, but before drying. If a stain resist compound is applied to the carpet, then generally a fluorochemical is applied afterwards by a spraying or foaming step as described in the preceding paragraph.

U.S. Pat. Nos. 5,219,620 and 5,366,161 describe methods of applying a foam composition through the primary backing of the fabric for the purpose of treating the pile side of the carpet. The patents indicate that the foam completely and uniformly penetrates through the carpet backing. The foam-applicator is designed to push the foam through the primary backing from the underside, to treat the pile fibers and provide stain resistance, soil protection and repellency thereto. Hence, there is not left any significant amount of the composition of the foam on the underside of the primary backing, and there is not provided a region on the underside of the backing that improves the liquid-barrier as in the present invention.

U.S. Pat. No. 5,520,962 and 5,851,595 to Jones describe improved methods of applying fluorochemicals and optionally stain resist compounds to carpet or carpet yarn. The methods include immersing the carpet or yarn in an aqueous medium have a pH of less than about 3.5 that contains the fluorochemical and optionally a stain resist compound. These methods provide carpets with excellent repellency characteristics.

Even with the methods described in the art, there is still a possibility that water or other liquids spilled on the carpet, can by drawn down through the carpet yarns by a capillary action. In such a case, the liquid can penetrate through the layers of the carpet below the tufted layer. For instance, if water, a water-based liquid, such as a beverage, soft drinks, soda, coffee, urine, or the like, or another type of liquid (e.g., oil-based) is spilled onto the carpet face, it may permeate through the primary and secondary backings and onto the underlying material, such as the carpet underpad and hardwood floors. The underlying material may become stained and deteriorate over a period of time. Mildew may also grow on the backing and underlying material, causing odor problems.

Different approaches have attempted to deal with this problem by reducing the permeability of liquids through the carpet. As discussed above, one method involves applying a fluorochemical or other water-repellent agent onto the face fiber of the carpet during the fiber-forming or carpet-manufacturing process. In such instances, the fluorochemicals serve to reduce the wettability of the fibers in the finished carpet such that a spilled liquid will initially "bead" on the surface of the fiber. However, if the beaded liquid is not promptly removed, it may eventually be absorbed by the fibers and may penetrate through the primary backing.

Another method for attempting to deal with this problem involves mixing fluorochemicals into the latex composition and then coating the primary carpet backing with the fluorochemical-containing latex. U.S. Pat. Nos. 4,579,762; 4,619,853 and 4,643,930, describe coating the underside of the primary backing with a latex containing fluorochemicals mixed therein such that the primary backing is made substantially impervious to water.

Another approach is described in U.S. Pat. No. 5,558,916, which describes a method for making a carpet having a secondary backing which is substantially impervious to liquids. The methods involve applying a repellent finish onto the underside of the secondary backing material. According to the patent, any liquid spilled on the carpet will become entrapped between the face fiber and the secondary backing. Vacuuming, sponging or other appropriate means can then remove the liquids. This method can be disadvantageous because the liquid may penetrate through the primary backing and hence be difficult to remove.

U.S. Pat. No. 5,714,224 describes applying a layer of polyolefin between the latex layer and the secondary backing for the purpose of providing a moisture barrier layer. This method can be disadvantages due to the extra costs involved in materials in forming the extra layer and in the extra processing step involved. Also, there could be delamination problems between the primary and secondary backing. A similar approach, with similar drawbacks, is described in U.S. Pat. No. 5,612,113, where a thin film of a thermoplastic material is adhesively bonded to either the primary or secondary backing.

Although the foregoing methods may be somewhat effective for providing the carpet with water impermeability properties, such methods may restrict the flexibility of the carpet manufacturing operation. In addition, if such carpets also have a secondary backing, latex containing the mixed fluorochemicals may possibly reduce the adhesion between the primary and secondary backings, thus reducing the delamination strength and tuft bind of the carpet. Moreover, addition of the fluorochemical to the adhesive can cause the combination to become frothy, thereby causing application problems. Also, the combination can cause the carpet to become stiffer, causing installation problems for the carpet.

Treatment of the secondary backing, as in the '916 patent, does provide protection for the materials underneath the secondary backing, such as the pad and subfloor. However, the latex layer, which is between the primary and secondary backing, can also wet out (become wet with liquid) from spilled liquids. This could weaken the latex and could lead to delamination between the backing layers. Moreover, liquids can become entrapped in the latex layer in the process of the '916 patent; and it is generally difficult to remove liquids from the latex layer. Moreover, the process of the '916 patent can be difficult to implement in the industry, because carpet-industry coaters are not set up to remove the water load that comes with application of foam to the secondary backing as taught in the '916 patent. This can lead to difficulty in drying and slower line speeds on the coater. Coaters are known to those in the art as a series of pieces of equipment that apply a coating or backing to the primary backing.

In view of the above disadvantages, it would be desirable to have an improved method for making a carpet with improved imperviousness to liquids. Such a method should be easily adapted to current manufacturing processes. It is also desirable to provide a carpet with improved moisture or liquid barrier qualities. The present invention provides such methods and carpet.

SUMMARY OF THE INVENTION

It is an object of the invention to provide carpet with improved liquid-barrier properties.

It is also an object of the invention to provide a method of improving the liquid barrier properties of carpet and to provide methods of making carpet with improved liquid barrier properties.

In accordance with these objective there is provided a method of producing carpet comprising (a) providing a carpet having a pile side formed from yarn fibers projecting through a primary backing layer, and an underside region comprising back stitch yarn fibers and the primary backing layer, (b) providing effective repellency enhancing amounts of a first repellency enhancing compound to the pile side, and (c) before application of a coating or latex layer to the primary backing, providing a liquid repellency enhancing compound to the underside region to provide improved liquid barrier properties in said region, wherein either (b) or (c) can occur first.

There is also provided carpet produced by such a method.

In accordance with the invention, there is also provided a method of providing a carpet that has improved liquid barrier properties comprising applying a repellency enhancing compound to the back-stitch underside of a primary backing layer of a carpet by spraying, padding, coating or foaming, before application of a latex, to thereby form a region comprising the primary backing and the back stitches with improved liquid-repellency properties.

There is also provided carpet comprising a primary backing layer comprising a pile side and an underside, a region substantially free of adhesive latex on the underside comprising greater than about 700 ppm of a fluorocarbon, and optionally, a secondary backing layer adhered to the primary backing layer by a latex.

There is also provided a primary backing for a carpet that comprises a pile side and an underside, wherein the underside contains an application substantially free of adhesive of a liquid repellency material applied by spraying or foaming.

There is also provided a method of producing carpet comprising providing a carpet having a pile side formed from yarn tufted through a primary backing layer, that is opposite an underside region comprising back stitch yarn fibers and the primary backing layer, providing effective stain-blocking amount of a stain blocking compound to the pile side, and before application of a latex or other layer, providing a liquid repellency enhancing compound to the underside region, where either (b) or (c) can occur first.

There is also provided a method of improving the liquid repellency of a carpet comprising applying an aqueous medium comprising a repellency enhancing compound to the back stitch side of a primary backing of the carpet before application of a latex or polymeric layer, to thereby form a continuous or discontinuous layer of the compound on said back stitch side that is substantially impervious to penetration by liquid.

There is also provided a method of producing carpet comprising treating carpet yarn with a first repellency enhancing compound or a stain blocking compound, forming the yarn into a carpet by stitching the yarn into a primary backing to thereby form a pile side projecting from the primary backing, and a back stitch side opposite the pile side, optionally providing effective repellency enhancing amounts of a first repellency enhancing compound to the pile side, and before application of a latex layer, providing a second repellency enhancing compound to the back stitch side to provide a region which is an improved barrier to liquids.

There is also provided a method of producing carpet comprising preparing a yarn suitable for use in carpet, forming the yarn into a carpet having a tufted side and a back stitch side, providing effective repellency enhancing amounts of a first repellency enhancing compound to the pile side, and before application of a latex layer, providing a second repellency enhancing compound to the back stitch side to provide a layer that is substantially impervious to liquid thereon, There is also provided a method of improving the liquid repellency of a carpet, comprising spraying, foaming, or padding an aqueous medium having a pH less than about 3.5 comprising one or more repellent compounds, onto the underside of the primary backing layer of a carpet.

There is also provided a process for treating carpet comprising contacting carpet fiber with a first aqueous medium comprising at least one stain resist or repellency compound, and contacting the carpet fiber with a second distinct aqueous medium which comprises one or more of a stain resist, repellency compound, or acid, wherein at least the first or second aqueous medium has a pH less than about 2.

Further objects, features, and advantages of the present invention will become apparent upon a reading of the specification.

DETAILED DESCRIPTION OF PREFERRED EMBODIMENTS

Figure 1A:
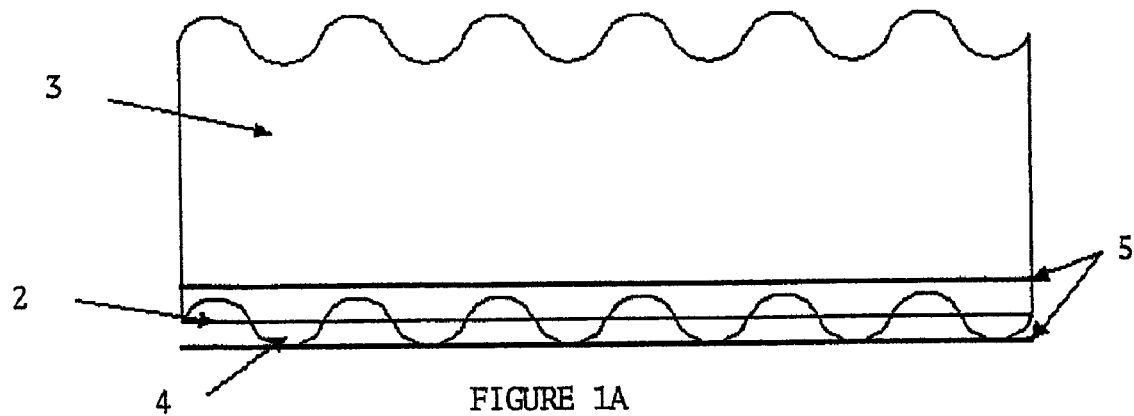
FIG. 1 shows typical layers of a carpet in cross section.

Referring to FIG. 1(a), there is shown a schematic, cross-section of an embodiment of a tufted carpet according to the present invention. The tufted carpet comprises a primary backing 2 and tufted pile 3. Tufts, 4, extend through the underside of the primary backing. The portion of the tufts that protrude through the primary backing are known in the art as backstitch fibers. Zone 5 is a preferred target zone for application of a repellent material according to the present invention, and includes the extended tufts, the underside of the primary backing, as well as explained in more detail below, preferably a small portion of the tufted yarn above the primary backing.

Figure 1B:
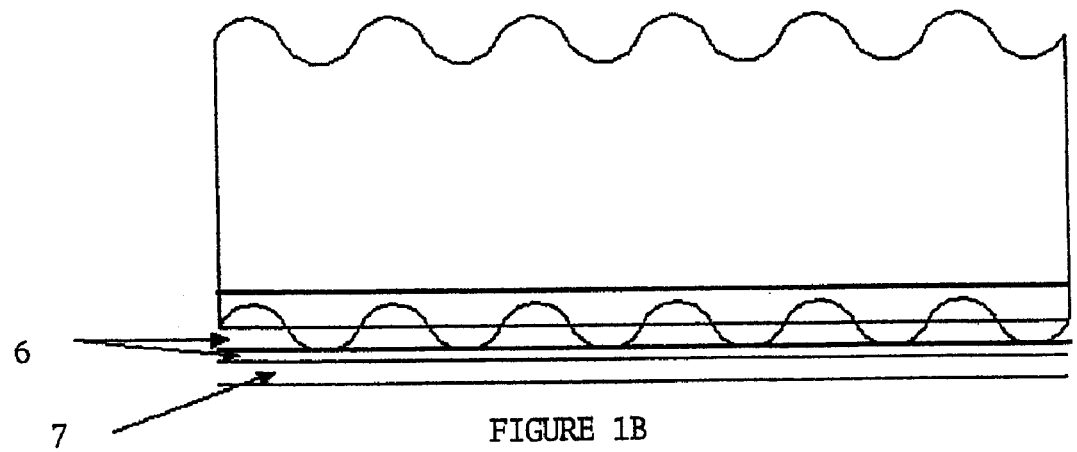

FIG. 1(b) shows a preferred embodiment, wherein a latex layer 6 and a secondary backing 7 are applied to the treated underside of the primary backing 2.

The latex layer 6 is affixed to the underside of the primary backing 2 and effectively locks the extending tufts 4 thereto. The secondary backing 7 provides dimensional stability and rigidity to the tufted carpet thereby facilitating the handleability thereof. According to the present invention, a liquid repellency-enhancing compound is applied to the underside of the primary backing layer in zone 5. Depending on the application method, this application may form a continuous or discontinuous film, or merely a zone of improved liquid barrier properties, e.g., that reduces the likelihood of a liquid penetrating through the primary backing 2 to the secondary backing 7. There is no requirement that a discontinuous or continuous film be achieved. The only requirement is that application of repellent material in the zone 5 is sufficient to achieve an improvement in the liquid-barrier effectiveness of the carpet. For example, application of a fluorochemical at a pH below 3.5 to the underside and then heating the treated substrate, produces the formation of a film on the surface of the treated material that is more or less continuous, so long as sufficient material has been applied to cover the entire surface area.

The present invention provides a process for treating carpets or carpet yarn to increase its liquid-repellency characteristics. Preferably the carpet or yarn to be treated has been previously dyed by conventional methods. Any conventional dyeing processes can be used. An advantage of the present invention is that no changes to the dyeing system are required for this method to be implemented.

Once dyed, both the pile side and the underside of the primary backing layer are treated with a repellent material. The underside of the primary backing can be treated with a repellent material prior to dyeing. However, this method is generally not preferred because the presence of the repellent material on the underside of the carpet could influence proper wetting and dyeing behavior in this area. Thus, it is preferred to apply the repellent material after dyeing.

As used herein, the term repellency is intended to have a relatively broad meaning, referring to a reduced tendency for soil, oil and/or water to adhere to the carpet fibers. A repellency enhancing compound or repellency compound or repellent material is a compound that when applied to the carpet provides such repellency. For treatment to the underside, the primary concern is with water and oil repellency, rather than soil repellency. Therefore, repellent materials can be chosen by one in the art to provide these features. On the other hand, for treatment for the pile side of the carpet, it is often desired to provide each of soil, oil, and water repellency. Accordingly, materials can be chosen by one in the art to provide these properties.

As used herein, the term stain resistance is also intended to have a relatively broad meaning, referring to a reduced tendency of the carpet fibers to be stained by acid dyes and/or disperse dyes.

When percentages are given, unless otherwise indicated, they are intended to refer to percentages by weight solids based on the total weight of the aqueous dispersion.

Any know type of carpet or carpet yarn can be treated according to a process according to the present invention. Preferably, the method is used to treat carpet, namely carpet yarn tufted into a backing material. Alternatively, the carpet yarn can be treated with a repellency enhancing compound and/or stain resist prior to being tufted into a carpet. After being tufted into a carpet, then the underside of the primary backing layer is treated with a repellency-enhancing compound.

Typically, the carpet yarn is made from an extruded synthetic polymer, such as nylon, polyester, polypropylene, acrylic or any other type of synthetic polymer. Alternatively, the carpet yarn can be made from a natural fiber, such as wool, silk, or cotton. The carpet can be made from a combination of different types of fibers. Preferably, the carpet yarn is made from extruded fibers of nylon 6, nylon 6,6, polyester, such as polyethylene terephthalate, or polypropylene. Other polymers that can be used include polyethylene, polyurethane, polycarbonate, polyacetal, and the like, as well as blends, combinations, and copolymers of any of the materials listed in this paragraph.

The extruded fibers can be made into yarn by any known method. Most preferably, the nylon yarn is a bulk continuous filament (BCF) yarn that is heat set by conventional methods, such as the Superba or the Suessen method known to those in the art. Alternatively, the yarn can be a staple spun yarn. Also, it is usually preferred that the yarn is not pre-treated with a fluorochemical by the yarn manufacturer.

As noted above, it is preferred that the carpet yarn has already been tufted by conventional methods into a carpet structure before being treated according to the present invention. Neither the stitch pattern nor the density appears to be critical to the practice of the invention. Also, if the carpet is to receive a dye treatment, such as application of an acid dye, it is preferred to complete that dye treatment before treating it by the present invention.

The primary backing may be any known in the art. For example, woven materials made from natural or synthetic materials, such as jute, wool, cotton, rayon, polyamide, polyester, or polyolefins, especially polypropylene and polyethylene, can be used. Also, non-woven backings may be used, for example made from synthetic fibers such as, for example, polypropylene, polyethylene, polyamide, polyester, or rayon, and the like, as well as blends, combinations, and copolymers thereof. Polypropylene is a preferred material for the primary backing.

The method of the present invention preferably includes two distinct treatment steps, one to treat the pile side and another to treat the underside. The steps can be performed in any order. As discussed above, the primary backing could be treated first, prior to tufting, but this is not the optimum method. To achieve the optimum barrier effect, not only the primary backing should be treated, but the back stitch fibers, and preferably also a portion of the fibers that protrude through on the pile side of the primary backing. The amount of the portion depends on the desired liquid-barrier effect and is generally about the first about 1 to about 30%, for example about 5 to about 20%, preferably about 8 to about 12%, for example about 10% by weight of fibers that protrudes on the pile side. To achieve an optimum liquid barrier, it is desired that at least 5% by weight of the fibers the are above the primary backing are treated. In the present invention, an application of repellency material is made to the underside of the tufted carpet at any time, prior to coating, to treat the targeted fiber areas.

Two separate treatment steps are generally preferred because the repellent content of the baths targeted for the pile side, and the underside of the primary backing are generally significantly different. Therefore, two separate application baths and applicators are preferred. For example, the pile side treatment for nylon would typically include a stain resist material, and a repellent or fluorochemical in the range of 150 ppm to 600 ppm based on total pile weight. The ppm and total pile weight can be calculated using methods known to those in the art. On the other hand, the underside of the tufted carpet preferably has a treatment of fluorochemical or other repellency material in a range to provide desired liquid barrier properties. For example, about 500 to about 2,500 ppm, for example about 700 to about 1,800, preferably about 800 to about 1,200 ppm, based on the total pile weight, can be formed on the underside.

As previously discussed, two independent steps are generally preferred to treat the tufted and underside. This is because, for a significant water barrier effect, the underside of the carpet should preferably be treated with a fairly high level of repellent material, for example, about 500 to about 2500 ppm fluorine, based on the total pile weight. Since the repellent material applied to the underside is targeted for treatment of the back stitches protruding through the primary backing, the primary backing, and perhaps a small portion, e.g., 10% or so of the tufts on the face side of the primary backing, the level of fluorochemical in this area is much higher that the level desired on the face side of the carpet for purposed of providing soil protection and repellency.

For instance, for a typical 32 oz per square yard carpet product (pile weight), there will be a primary backing (typically a 11 pic (as known in the art, pic is a measurement of filaments per inch) count backing) that weights 3.4 ounces per square yard. The yarn protruding through to make up the back stitches might weigh in the range of 3 ounces per yard, and the 10% of the pile on the upper side of the primary backing would weight in the range of 3.2 ounces per square yard. The sum of the back stitch fiber, 10% fiber on the upper side (immediately above the primary backing), arid the primary backing, would weigh 9.6 ounces. The level of repellent fluorochemical expressed in ppm for this targeted treatment area is in the range of 1,500 ppm (at 500 ppm on total pile weight) to 15,000 ppm (at 2500 ppm based on total pile weight). It would not be necessary or desirable to apply this very high level of fluorochemical or repellent material to the entire carpet pile. Extremely high levels of repellent material applied to the carpet pile can create soiling problems, and hand or softness deficiencies. The expense of applying these high levels of repellent or fluorochemical to the entire carpet pile would also be prohibitive.

A. Treatment of Tufted Side of Carpet

It is again emphasized that the treatment of the pile side and underside can occur in any order. Also, in some circumstances there may not be a need to treat the pile side at all, arid only the underside is treated. For example, if the yarn is pre-treated with fluorochemicals by the yarn manufacturer, the pile side often is not treated. Preferably, the carpet yarn, either before or after it is tufted into a carpet, is treated to improve the repellency of the tufted yarn, for example, with a fluorochemical. Any desired method can be used to apply the fluorochemical or other repellency material to the yarn or tufted side of the carpet. For example spraying, foaming, immersing, padding, or coating as known in the art can be used. As noted, in addition or alternatively, the yarn can also be pre-treated by the manufacturer with a repellency-enhancing compound.

A conventional two-step method of application of stain resist and fluorochemical to nylon can be used. The first step involves application of a bath containing a stain resist compound, and a pH adjustment chemical and optionally a divalent metal salt, such as magnesium sulfate. The pH of this treatment bath is generally from about 1 to about 5, typically about 2 to about 3. The bath is applied to the carpet pile and then a heating step is performed to exhaust the stain resist from the bath and onto the fiber. The tufted carpet is then rinsed and hydroextracted to remove moisture.

In this conventional process, the fluorochemical is then typically applied to the pile side in a second application. This is typically done using a spray bar or foam applicator. The fluorochemical emulsion is applied to the pile side of the tufted carpet in a concentration to achieve between 150 ppm and 600 ppm nominal levels of fluorochemical based on total pile weight. This application is typically done immediately prior to the entrance of the carpet into a wet goods dryer or coater conventional in the industry. A wet goods dryer is a dryer conventional in the industry that includes a series of zones to dry the carpet, generally by heated air. For example, the carpet enter the wet goods dryer having a moisture content of about 40 to about 50% by weight, and upon exiting the dryer, has a content in the range of about 2 to about 4% by weight. For polyester or polypropylene carpet, the step of applying the stain resist is generally omitted.

Preferably, one or more of the methods described in U.S. Pat. Nos. 5,520,962 or 5,851,595 is used to treat the pile side of the carpet. Both of these patents are incorporated herein by reference in their entireties. For example, the yarn or carpet can be contacted, for example by immersion; with an aqueous medium with a pH below about 3.5 that contains a repellency compound comprising an anionic or nonionic fluorochemical. Unlike the process of U.S. Pat. No. 5,084,306, the preferred processes do not require the use of a water-soluble salt of a divalent metal.

If a stain resistant compound is to be applied to the carpet, it can be included in the aqueous medium. For example, the aqueous medium can further comprise an anionic polymer-binding compound, such as a polymer of methacrylic acid, as a stain resist compound. Also, it is possible for a stain resist compound, without a repellency compound, to be applied by immersion through an aqueous medium. A preferred pH application for application of a stain blocker alone is about 2 to about 5. The ideal pH range can be determined by choice of stain blocker, the fiber being treated, and the heating conditions used for exhaustion of the stain blocker. After application of the stain blocker, if not applied with the stain blocker, then the repellency compound can be applied, for example, by spraying or foaming.

The treatment of the pile side preferably employs an aqueous medium comprising a fluorochemical compound. However, other repellency compounds such as silicone-based compositions, wax emulsions, naturally occurring oils, silicate polymers, block isocyanate polymers, and hydrophobic acrylate resins can be used, and applied by any method desired, such as spraying, foaming, padding, or immersion in an aqueous medium.

Any known fluorochemicals that can provide repellency to the pile side of carpet can be used. For treatment to the pile side, the fluorochemical compound is preferably an anionic or nonionic fluorochemical. The fluorochemical can be a telomer type or an electrochemically fluorinated fluorochemical. Suitable fluorochemical compounds include FX-1367F and FX-1355 both from 3M Specialty Chemicals Division, NRD-372 from DuPont Flooring Systems, TG-232D, TG 3311, and TG-571 from Daikin America, Decatur, Ala., USA (formerly Advanced Polymers, Inc.), and Nuva 3555 from Hoechst Celanese.

Based on the offerings today for fluorochemicals, chemicals include 3M's PM1396, Daikin TG 3311, TG 571b, TG 3360, TG 472, DuPont N119, N140, Zonyl 8779, and Clariant NUVA CPA. Fluorochemical products that can be used span the entire range of mildly cationic materials, non-ionics, to anionic products.

U.S. Pat. No. 5,558,916 and 5,908,663, both incorporated herein by reference, describe examples of repellency compounds, such as fluorochemicals, as well as stain blockers, that can be used to treat the tufts and/or the underside of the primary backing layer of the present invention.

The level of fluorochemical in the aqueous medium is set so as to produce the desired level of fluorochemical on the tufted layer of the carpet. Preferably, the fluorochemical is present between about 0.0035 and about 0.175 percent solids of the medium. More preferably, the fluorochemical is present at between about 0.015 and about 0.080 percent, most preferably, about 0.02 percent.

Preferably a commercially available flex nip applicator is used to apply the chemicals to the tufted side. The flex-nip applicator inherently does apply some of the treatment bath to both sides of the tufted carpet, but as used in the art generally does not apply sufficient repellent material to the underside to provide a water-barrier effect.

As described in the Jones' patents, it is preferred that the aqueous dispersion has a pH of below about 3.5 when the carpet yarn or carpet is immersed in it. This pH is lower than the pH of conventional fluorochemical compositions applied to carpets. Nevertheless, it is believed that the lower pH helps drive the fluorochemical out of solution and onto the tufted carpet yarn fibers. Preferably, the pH of the dispersion is above about 1.0 and below about 3.5, more preferably, between about 1.2 and about 2.5, most preferably between about 1.5 and about 1.8. One of skill in the art depending upon the fiber type being treated and the desired performance level can optimize the pH and heating conditions.

This pH can be obtained by adding the appropriate amount of an acid, such as urea sulfate or sulfamic acid, to the aqueous dispersion. Any acid that has the proper strength to achieve the desired pH ranges can be used. Organic acids are generally not preferable due to negative effects they can have on the fibers, and the effluent and expense considerations. Inorganic acids are mainly used. The selection of these is based again on economics and corrosion properties. Urea sulfate and sulfamic acid are two of the more preferred products to use.

When the carpet is to be treated with a stain resist to improve the stain resistance of the carpet, for example, when the carpet contains reactive groups such as in nylon, the stain resist is preferably present in the aqueous medium. However, the stain resist can be present in a separate aqueous medium or applied to the tufted side of the carpet by any desired method, including spraying or foaming. Any known stain resist agents can be used. For example, U.S. Pat. Nos. 4,619,853 and 5,948,480 describe various stain resists and soils resists (repellency compounds) that can be used in the present invention. These patents are incorporated by reference in their entireties.

For example, the aqueous dispersion can include an anionic binding compound, which can act as a stain resist. More preferably, this anionic binding compound is one that also serves as a stain resist compound, although this function is not required. For example, when the carpet yarn is made from polypropylene, there are no acid dye sites for the anionic binding polymer compound to block. Nevertheless, it has been found that the use of the anionic polymer-binding compound can improve the performance of the fluorochemical compound on polypropylene carpet yarn.

Preferred anionic polymer binder compounds are polymers or copolymers of methacrylic acid. Preferably, these polymers or copolymers have a molecular weight range such that the lower 90 weight percent has a weight average molecular weight in the range of about 2500 to 250,000 and a number average molecular weight in the range of 500 to 20,000.

Currently, a preferred anionic polymer binding compound is a polymethacrylic acid commercially available from Rohm & Haas under the designation Leukotan 1028. The molecular weight of the lower 90 weight percent based on weight average for Leukotan 1028 is reported to be 9,460 and based on number average is reported to be 5,592.

Another preferred anionic polymer binding compound is a polymer of methacrylic acid designated XP-4-49 which is made according to the procedure described in U.S. Pat. No. 5,851,595. Preferably, the XP-4-49 is mixed with a lesser amount of a phenolic type stain resist compound sold by Sybron Chemicals, Inc. under the designation "Tanatex Stainfree." The preferred ratio of XP-4-49 to Tanatex is about 18:1 based on solids.

Other anionic polymer binding/stain resist compounds can be used, including FX-369, FX-668F, FX-661, and FX-657, from the 3M Specialty Chemicals Division. The principal ingredient of FX-369 is believed to be a phenolic-methacrylic acid copolymer. All of the other 3M stain resist compositions are believed to comprise a methacrylic acid polymer or copolymer and to be described in either U.S. Pat. No. 4,937,123; 4,822,373 or both. FX 657 is used in the example and is a currently preferred stain resist compound.

The composition sold by DuPont Flooring Systems as SR 500 from DuPont, which is a styrene-maleic anhydride copolymer can be used.

In addition to the Leukotan 1028 referred to above, other Leukotan compounds from Rohm & Haas can be used, including 1027, 970 and 1084. With the exception of the Leukotan 1084, the Leukotans are all polymers and copolymers of methacrylic acid of varying molecular weights. Although these compounds are generally sold to the tanning industry, U.S. Pat. No. 4,937,123 refers to this group as having stain resist properties when applied to nylon carpet fibers. Leukotan 1084 is believed to be a polymer of acrylic acid.

Preferably, the anionic binding/stain resist compound, when present at all, is present in the aqueous medium at a level between about 0.05 and about 2.5 percent solids, more preferably between about 0.5 and about 1 percent. Such a stain resist compound is not needed for the treatment to provide a liquid barrier effect for the underside, but can be used if desired.

The aqueous medium can be made up by the following procedure. For example, a simple procedure of adding water, then fluorochemical, then acid to adjust pH can be used.

Typically, the fluorochemical and stain resist compounds are provided by the manufacturer in a concentrated aqueous dispersion. These concentrates can be simply added to the remaining water in a vessel and stirred at room temperature. Because some of the fluorochemical and/or stain resist compositions are in emulsion form that can be sensitive to high shear; the stirring is preferably done at low shear. The pH is measured and the appropriate amount of acid is added to bring the pH to the desired level.

If the fluorochemical and stain resist compound are not compatible, for example as explained in U.S. Pat. No. 5,948,480, then they can be applied in separate baths. For example, there can be a separate aqueous bath for the fluorochemical or other repellency compound and a separate bath for the stain resist. Each bath preferably has a pH less than about 3.5, more preferably between about 0.5 and about 2.5, most preferably between about 1 and about 2. The application of stain resist alone can take place at a pH ranges as high as 5, e.g. 1 up to about 5, depending on the selection of stain resist chemistry, and the fiber being treated. But the preferred ranges are as set forth above, e.g. less than about 3.5.

If multiple baths are used, they can be in any order. Alternatively, the first bath in the series can have any desired pH, and the second bath or another bath can have reduced pH such as less than about 3.5, to thereby affect the exhaustion of the chemicals onto the carpet. Also, the fluorochemical and stain resist compound can be in the same bath at any desired pH, for example, about 3 to about 8, and then immersed in a separate aqueous bath with a reduced pH (e.g. less than about 3.5) as described above, to thereby effect the exhaustion of the chemicals onto the carpet.

Alternatively, a conventional process of applying stain resist from an aqueous bath, and then applying the fluorochemical by foaming or spraying can be used. If a multiple bath set up is used to treat the pile side, then such an arrangement forms part of the invention, even without the use of a treatment for the underside.

In another embodiment, there could first be applied the fluorochemical or repellent application for the underside, then the stain resist applied to the pile side, then the fluorochemical or repellent application applied to the pile side. These three steps could be done in any order. They would preferably be followed by a heating step to provide the optimum performance. Then rinsing, hydroextraction, followed by drying, are performed.

To treat the pile side, the carpet yarn or carpet is preferably immersed in the aqueous medium. Preferably, this is accomplished by immersing the carpet in a bath of the aqueous medium. Most preferably, the carpet is immersed by drawing it through a puddle of the medium in an apparatus such as that known in the industry as a "flex nip applicator." Alternatively, the carpet can be placed in a vessel containing the aqueous medium. Still further, the aqueous medium can be sprayed or cascaded onto the carpet so as to immerse the carpet.

KDA or KFA flex nip applicators can be used. KDA is a dye applicator produced by Kusters Machine Fabrication Company in Krefeld, Germany. The KFA is a similar machine designed for foam application. Both devices are set up to apply the treatment bath (either liquid or foam) from a slot positioned on the pile side of the fabric. The machines use a bellow to apply pressure from the underside of the fabric; this produces a squeezing action that helps to penetrate the application bath throughout the pile.

The amount of aqueous medium applied to the carpet is preferably such that it will provide a ratio of carpet to aqueous medium of at least about 0.5 to 1. A common expression for the amount of liquid applied to carpet is "wet pick-up." Wet pick up is defined as the weight of the applied material divided by the weight of fiber or fabric to which it has been applied, multiplied by 100. For example, if 100 grams of water are applied to 100 grams of fiber, this is expressed as "100% wet pick up". The preferred wet pick-up for treatment of the pile side is at least about 50 percent. More preferably, the wet pick-up is between about 50 percent and about 6000 percent, i.e. a ratio of 0.5:1 to 60:1. Most preferably, the wet pick-up is between about 200 and about 500%, i.e. a ratio of 2:1 to 5:1. The control of the wet pick-up level can be accomplished by conventional methods, such as squeeze rollers and the like.

An advantage of applying the chemicals via immersion in an aqueous medium is that the spraying of the tufted side often used in conventional processes can be eliminated. Also, the stain resist and repellency compound can be advantageously applied from a single bath. Thus no additional drying of sprayed chemicals is needed, and the production line can be sped up. Using the co-application method for both the stain resist and fluorochemical compounds, and then fixing these with heat provided by steaming, followed by a rinse, and hydroextraction, has the advantage of eliminating the need to spray or foam on a fluorochemical emulsion prior to the wet goods dryer or coater oven (the oven in the coater set-up). The elimination of this wet load increases the speed with which the material can be processed through the dryer. For example, the hydroextraction can reduce the water content to about 35% by mechanical methods. Thus the carpet entering the wet goods dryer has a water content of about 35%, as opposed to, e.g. about 45 to about 55% if a conventional process of spraying or foaming an aqueous fluorochemical on the pile side prior to dry fixing in the wet goods dryer.

However, if desired, the tufted side can also be sprayed in place or in addition to the immersion treatment. That is, the tufted side of the carpet can be treated in any way desired or known in the field to provide repellency enhancing properties and/or stain resist properties.

B. Treatment of the Underside of the Tufted Carpet

In the present invention, the underside of the tufted layer is treated with a repellency compound. This can be accomplished before or after the tufted side is treated and at any place in the process prior to coating, e.g., of a latex layer. Any desired repellency compound or mixtures of compounds can be used, such as a fluorochemical, silicone-based compositions, wax emulsions, naturally occurring oils, silicate polymers, block-isocyanate polymer systems, and hydrophobic acrylate resins. The same or different repellency compound can be used on the pile and underside. Any of the repellency chemicals mentioned above with reference to the tufted side can be used. The underside can be treated before or after the tufted side is treated. Also, the tufted side need not be treated, and only the underside treated. The repellency compound can be applied to the underside by, for example, spraying, padding, brushing, or foaming onto the underside of the primary backing. These techniques are well known to those in the art. This step is conducted before a coating layer, which is often conventional latex and secondary backing, is applied.

The purpose of this treatment is to provide a region in the carpet matrix that reduces the likelihood that liquid will penetrate through the secondary backing. So long as there is any measurable improvement, then the process is within the scope of the invention. It is preferred that the treatment provides a significant barrier to liquid penetration through the carpet matrix. The treatment should preferably apply sufficient repellency compound so that there is provided a barrier that is "substantially impervious to liquid." This phrase means that a volume, for example 5 to 25 milliliters, of a liquid, for example, cherry-flavored, sugar-sweetened Kool-Aid, when applied to the pile side of the carpet, does not significantly penetrate through the secondary backing in 24 hours. See also the definition of "substantially impervious" and test methods set forth in U.S. Pat. No. 5,558,916, which is incorporated herein by reference, which are also applicable in the present invention. The liquid can be water, a composition containing water (coffee, wine, soda, juice, beer or the like), or a non-aqueous liquid composition, such as oil.

Preferably an aqueous medium containing fluorochemical is sprayed, padded, or foamed onto the underside of the tufted layer. Preferably the aqueous dispersion has a pH of below about 3.5 when applied to the underside. It is believed that the lower pH helps drive the fluorochemical out of solution and onto the primary backing. Preferably, the pH of the dispersion is above about 1.0 and below about 3.5, more preferably, between about 1.2 and about 2.5, most preferably between about 1.5 and about 1.8. The use of baths with pH values in the range of 2.0 and below are surprising from the standpoint that high levels of exhaustion for fluorochemicals can be achieved from these baths when they are applied to the fibrous underside and subsequently heated by a medium such as saturated steam. The fibrous material can be nylon, polypropylene, polyester, blends of these, or the like described elsewhere as materials for the primary backing and the yarns.

This pH can be obtained as described above for the treatment of the tufted side, by adding the appropriate amount of an acid, such as urea sulfate or sulfamic acid, to the aqueous dispersion. As discussed above with reference to the bath for treatment of the pile-side, any desired acid can be used to reduce the pH to the appropriate level.

If foaming is to be done, then the composition should contain an appropriate foaming agent as is understood in the art. Commercially available foaming equipment can be used. U.S. Pat. No. 5,558,916 and 5,219,620, both incorporated by reference herein, describe foaming systems and foaming agents that can be used. However, the systems of the '620 patent should be adapted such that the foam does not significantly penetrate through the primary backing layer.

Also, spraying can be used as has been conventionally done to treat the pile side of carpet. The current spray technology for the pile side can be used to spray the underside.

Regardless of the method of treating the underside of the primary backing layer, there should be formed on the underside of the backing a region or zone that provides at least some barrier to liquid penetration, and preferably a substantial barrier to liquid penetration. When the repellency compound is applied for an aqueous bath, the preferred ranges for percent solid of the compound in the aqueous bath is about 1.75 to about 0.0035% solids; more preferably 0.75% to 0.015%, for the typical fluorochemical product that is 10% fluorine, and 30% total solids. For this application targeted on the underside of the tufted carpet, the desired percent wet pick-up (wpu) ranges from 100% to 5%, with more desirable ranges being 80% to 10%, and most desirable being from 40% to 15%. The wpu for the treatment of the underside is significantly less than that of the tufted side because it is preferred that the treatment not penetrate the carpet much beyond the desired treatment zone. The ppm fluorochemical or other repellency compound added to the underside treatment zone is preferably in the range of about 500 ppm to about 2500 ppm based on total pile weight.

For the treatment to the underside, a highly liquid repelling material or fluorochemical is desired. There is generally no requirement for soil repellency on the underside, since soil generally does not penetrate through the primary backing. The fluorochemical products that are designed as liquid repellents only, and not targeted for soil repellency, typically have a softer film (lower glass transition polymer film), and are generally less expensive as compared to the harder film materials designed for both liquid repellency and soil protection. Thus, it is preferred to use those products designed only for liquid repellency for the underside treatment.

The use of a polymethacrylic acid polymer, or other polymeric material may enhance the exhaustion and fixation of the fluorochemical or repellent material to the fibers in the targeted treatment zone, but are not be required for the present invention. All that is required is that a repellent material be applied to the underside treatment zone. No additional components are necessary. Nevertheless, the compositions applied to the carpet pile and/or the underside can optionally include components in addition to the repellency enhancing compound, such as surfactants, antimicrobial agents, dyes, pigments, antistatic agents, fire retardants, antioxidants, UV screeners, and/or stain resist compounds. While the mentioned materials could from time to time be useful in the treatment bath targeted for the pile side, it is an advantage of the present invention that they are not required for the bath used for the underside to provide the liquid barrier effect.

Optionally, after treatment of the underside, the tufted side can also be treated as is done conventionally. For example, by spraying a fluorochemical onto the tufted side. This step, however, is generally not needed, since the tufted side is treated by immersion in an aqueous bath that contains a repellency material, such as a fluorochemical before or after the treatment of the underside.

C. Process Parameters

After treatment of the underside and tufted side, there is preferably followed a heating step for wet fixation of the repellent material in the target zone described above as well as to the tufted side. The repellency materials are preferably applied to each side prior to the wet good dryer or a coater heating zones, followed by dry fixation by heat in the oven zones. The treated carpet can enter the dryer without steam-fixing and hydroextraction, but it is preferred to perform these steps to fix the chemicals to the carpet and to reduce the water content of the carpet before entry into the wet goods dryer. This allows the carpet to pass through the wet goods dryer at a faster speed, since less water needs to be removed One method of application of the barrier layer on the underside, could include mounting an application device for the underside of the carpet on a coater, and providing a short dryer zone after the applicator to fix the repellent, prior to the application of the latex compound. However, this procedure complicates the operation of the coater. This might be desirable, however, for carpet products that do not require a dyeing step, such as predyed product, which as known in the field are yarn produced to have color by addition or a pigment or colorant to the polymer melt. Thus, the barrier layer can be applied at the coater.

As discussed above, any desired method can be used to accomplish the desired results of treating the pile side and underside. Separate treatment sections, including an applicator, steamer, rinser, and hydroextractor, could be set up for the pile side and the underside. However, this would require the addition of extra equipment for steaming, rinsing, and hydroextraction, as well as requiring more floorspace, so this method would usually not be desirable. Instead, it is preferred that the same steamer, rinser, and hydroextractor be used for both treatment sections.

One method includes treating the underside with spray or foam prior to the wet goods dryer, but after any steaming. This method is generally not advantageous because the wet load going into the dryer is higher, and would reduce the dryer speed. Instead, it is preferred to locate a second applicator for the underside of the carpet prior to the steamer used currently for fixation of the pile side treatments. Therefore, the same steamer can be used to provide the fixation energy for the treatment applied to the underside of the tufted carpet. The second applicator can be positioned either before or after the current pile side applicator. A currently preferred position is prior to the pile side applicator.

A preferred method includes foam application of repellent material to the underside and then foam application to the pile side of a repellent material and/or stain resist, followed by fixation of the chemicals in a steamer. Another usually less preferred method includes foam application of repellent material to the underside followed by application of repellent material to the tufted side by a spray bar. The treated carpet then enters the dryer without any steaming step.

After application of the repellency compound to the tufted and/or underside, the carpet or carpet yarn and aqueous medium may then optionally be heated, generally be a commercially available steamer, such as used in the industry today, to fix the chemicals and remove excess water from the carpet. In a preferred method, no heating occurs between the treatments of the pile and underside, but instead the steaming, heating, and rinsing occur after both treatments. It is advantageous to heat the carpet after both treatments, so as to reduce the energy consumed and to increase speed of the production line.

If the yarn has been treated before being tufted into a carpet, then preferably prior to the underside of the tufted layer being coated, the yarn is tufted into a carpet. Also, as mentioned above, in addition or as an alternative to treating the backing after it is formed into tufted carpet, the primary backing can be treated with the repellency material before incorporation into the carpet.

Heating the carpet after application of the repellency chemicals to the pile and backside has been found to enhance the performance of the method of the present invention. The heating can occur between the two steps of applying repellency compounds to the carpet, but preferably occurs after both the pile and the underside of the tufted carpet is treated. Preferably the treatment of the tufted and backside proceed without any intervening heating, steaming, or rinsing. The heating step greatly shortens the time needed to achieve desired exhaustion of the e.g., fluorochemical compound onto both sides of the carpet.

It has been found that heating is not required for exhaustion of the fluorochemical onto a fibrous substrate. It occurs over time at room temperature, if the material is left in contact long enough, especially if a neutral pH is used. This is generally not of any practical value, however, since one is always pressed for time in the manufacturing environment. If dry fixation, that is using heated air, as opposed to steam is used, such as is the case with spray or foam applications followed by dry heat exposure in an oven, the pH can be selected as desired. However, it has been found that lowering the pH of the spray or foam/dry fix baths can provide a measureable improvement in the repellency of the treated material even if only a dry-fix is used. For example, applying the material at a pH of about 3 to about 5, instead of about 5 to about 7, can provide advantages. However, it is generally not preferred to spray corrosive liquid due to corrosion concerns with the application equipment. Therefore, a pH of about 6-7 is generally used if spraying is used followed by dry fixing.

Thus, although not required, the steam fixation can improve the efficiency of the method. While not wishing to be bound by any particular theory, it is believed that the heat treatment helps cure or fix the molecules of fluorochemical to the carpet yarn fibers, as well as to the underside of the primary backing material.

Preferably, this heating step is performed at between about 160° F. and 260° F. for between 15 second and about 60 minutes, more preferably between about 180° F. and about 220° F. for between about 30 seconds and about 8 minutes. Most preferably, the heating step is accomplished by exposing the carpet steam at ambient pressure, i.e. 212° F. for about 1.5 minutes.

In laboratory simulations, after the heating step, the carpet is preferably rinsed to remove excess chemicals. This rinsing can be done by conventional methods. After rinsing, the excess water is preferably removed by conventional means, such as a Bock centrifuge. Typically, the water content after centrifuging will be about 20-30 percent. After the excess water is removed, the carpet is preferably dried in a conventional oven. Typically, the carpet is dried at about 220° F. for between about 6 and about 8 minutes.

The prior paragraph description relates to the lab process used for simulation of the line. In the actual line equipment, large hydroextraction pumps are used instead of a centrifuge to remove the water down to a level of 30 to 40% wpu. A wet goods dryer generally operating at 250 to 280 F air temperature is used for drying on the production line. The exposure time in the dryer is generally in the range of 1 to 3 minutes.

An advantage of the present process is that it can be easily added to current processes used today in carpet mills. For example, today dye ranges are set up with an applicator for pile treatment that applies the stain resist compounds, repellents or fluorochemical, and other auxiliaries as desired, followed by a steaming step for exhaustion of the treatment chemical onto the fiber, then a rinsing step, and hydroextraction. After this, the material is dried with no further treatment step, this allows the lowest moisture level possible going into the wet goods, which allows for maximum dryer speeds. The application to the underside can be added anywhere in the process, but as discussed above preferably prior t the steamer.

D. Latex and Secondary Backing Application

Using methods conventional in the art, a coating, such as a latex, is usually applied to the underside of the primary backing layer, which according to the present invention has had a repellency treatment applied thereto. The carpet is preferably dry prior to coating. The adhesive is applied after the repellency active agent (such as a fluorochemical) has been exhausted or transferred onto the primary backing layer.

The latex generally comprises a synthetic polymer and is applied to the underside of the primary backing layer to lock the tufts into place and to provide an adhesive for the secondary backing material typically applied. In addition or alternatively, the latex can be applied to the topside of the secondary backing. Any suitable adhesive latex may be used. The latex may include fillers, such as calcium carbonate, silica, talc or clay. Suitable polymers include one or more of styrene-butadiene copolymers (SBR), ethylene-vinyl acetate copolymers, and polyacrylates. Other latexes that can be used include, without limitation, a natural rubber compound or preferably a synthetic elastomer such as, for example, butadiene-acrylonitrile, butadiene-styrene-acrylonitrile, chloroprene, and the like. Also contemplated are the above mentioned synthetic elastomers, further containing vinylpyridine and/or an acidic monomer such as, for example, methacrylic acid. Moreover, the polymer phase of the latex may contain a functional group resulting from the use of an unsaturated monomer containing a carboxy group; e.g., a carboxylated styrene-butadiene.

The latex layer may be formed by merely drying the latex, or the latex may contain a vulcanizing or curing ingredient and/or an accelerator such as, for example, a dithiocarbonate. Latex compounds which must be cured in order to form the latex layer according to the present invention are typically subjected to a heating operation during the lamination step, for example up to about 250° F., and may be effected by any conventional manner such as, for example, a gas fired oven. As known in the art, the amount of latex required to lock and encapsulate the loops of yarn to the primary backing generally varies from about 10 to about 40 ounces per square yard, depending upon the latex used, the type of primary backing, the nature and quantity of the loops of yarn, etc.

Any desired secondary backing known in the art could be used. Those preferred include backings comprising jute, woven tapes of polypropylene, plain woven polypropylene fabrics, felts, and thermoplastic polymer films. Polypropylene is preferred for both the primary and secondary backing layers.

Other secondary backings that can be used comprises a polyolefin film including reinforcing filaments. Examples of polyolefin materials include, but are not limited to, high, medium, and low density polyethylene, polypropylene, polybutylene, and the like, as well as blends and copolymers thereof. The reinforcing filaments may comprise conventional materials such as, for example, glass or metal fibers, or polymeric fibers made from polyester, acrylic, polycarbonate, and the like, as well as blends, combinations, and copolymers thereof.

As discussed above, typically the carpet is rinsed and dried prior to coating , when the material is dyeable yarn, (dyed after formed into a yarn), such as nylon or polyester. If the material is colored at the extrusion process during formation of the yarn, for example for polypropylene yarn, then the tufted carpet can come directly to the coater after the pile side is sprayed, so it never has to be dried or rinsed prior to coating In certain embodiments, extrusion colored carpet (carpet formed from yarn that is colored during the formation of the yarn) can be scoured to remove the finish, or to apply a high performance repellent treatment to the pile side. This step should preferably be done prior to the coater.

While it is preferred to dry the carpet before coating, there is available equipment that coats the dyeable carpet in a wet state, after dyeing and rinsing, but without drying. The coating oven is sized to accomplish both the drying of the pile, and the drying of the coating compound. Thus, drying of the carpet is not required prior to coating.

The carpet manufacturer, prior to sale nearly always applies a backing of some sort to the tufted carpet. In the present invention, the underside is treated before the backing is applied, regardless of the type of backing. The backing is most commonly a filled latex compound, for example latex with calcium carbonate filler, and a secondary backing as discussed above, or a filled latex compound only (known as a unitary backing), or a urethane foam backing, or an ethylene-vinyl acetate polymer coating, or a polyvinyl chloride coating. Other types of polymer coatings can be used. The most preferred coating and that primarily used in residential carpet, is filled SBR latex/secondary backing approach. However, any type of backing can be used in the present invention.

As described in U.S. Pat. No. 5,558,916, which is herein incorporated by reference in its entirety, a repellent finish can be applied to the underside of the secondary backing if desired. However, such is not needed in the present invention because the treatment of the target treatment zone, which includes the primary backing, the back stitch fibers, and generally a small portion of the fibers protruding through the upper side of the primary backing achieves the desired barrier effect.

As described in U.S. Pat. No. 5,714,224, incorporated herein by reference, a polyolefin layer can be disposed between the latex and secondary backing. Again, however, such is not needed in the present invention.

Once the secondary backing is applied, the entire carpet structure is usually heated as known in the art to dry and cure the latex.

EXAMPLES

The following examples are provided by way of explanation and illustration. As such, the examples are not to be viewed as limiting the scope of the invention as defined by the appended claims.

Example 1

The following starting greige was used in example 1. This yarn is formed from nylon 6, available from Honeywell, which has not been pre-treated with a flurocarbon or antistatic agent. However, yarns can be so pretreated if desired. Any available yarn can be used.

Yarn Component—313754
Style—MTX
Count—1388/2
Vendor—Honeywell
Heatset—FB
oz/yd$^2$—58.00
Gauge-TC-Type-CD = ⅛
Cut Pile
HI – PH = 19/32
Stitch/6 – IN = 63.00
Antistat—No
Fluorocarbon—No The greige was dyed by the following procedure, using 400% wpu:

1. Prepare chemical stock solutions using tap water and the designated chemical at the grams per liter value provided by the recipe.
2. Prepare dyestuff stock solutions using distilled water, at a one gram per liter concentration.
3. Cut carpet greige samples to fit into the 12" by 6" stainless steel flat pan applicator with plexiglass lid.
4. Record the weight in grams of each greige sample to be dyed. Use this weight and the % owf values for the dyes and chemicals to extend the amounts of each material required for the dyebath.
5. Add the dyebath to the flat pan applicator, be sure that the applicator is on a flat surface.

-continued

6. Immerse the carpet greige sample to be dyed pile down into the applicator pan.
7. Press the carpet greige sample using the plexiglass lid to aid in leveling the dyebath application
8. Place the carpet greige sample with dyebath applied onto the horizontal steamer tray with the pile down. Steam for 2 minutes, turn the steam valve off, remove the tray from the steamer, turn the carpet greige sample pile up, re-insert the tray into the steamer and steam for an additional two minutes.
9. Turn the steam valve off. Remove the dyed carpet greige from the steamer and rinse the greige under running tap water for 30 seconds.
10. Place the rinsed carpet greige into the centrifuge and spin for 2 minutes.

The following chemicals were used in the examples:
The grams per liter values are used for all materials. (Grams of material per liter of application bath).
STS—sodium thiosulfate—antichlorine product—Vulcan Chemicals—Dalton Ga.
SHMP—Sodium hexametaphosphate—water softener—Vulcan Chemicals
Defoamer 389—silicone based antifoam—Lenmar Chemicals—Dalton Ga.
DOSS 70—di-octal sulfosuccinate wetting agent—Manufacturers Chemical of Dalton
Dowfax 2A1—surfactant, leveling agent—Dow Chemicals—Midland Mich.
35% Phosphoric Acid—pH adjustment—Vulcan Chemicals
Orange TC—Yorkshire Americas—Dalton Ga.
Telon Red 2BN/Blue BRL—Dystar—Frankfurt Germany
FX 657—stainblocker—3M—St. Paul Minn.
TG 3311—fluorochemical for soil resistance—Daikin America—Decatur Ala.
TG 571—fluorochemical for liquid repellency—Daikin America
A-80 Acid—urea sulfate—Peach State Labs—Rome Ga.

The dyed carpet was treated in an aqueous bath to apply fluorochemical and stain blocker to the tufted layer and the underside of the primary backing. The following procedure was used.

1. Prepare chemical stock solutions using tap water and the designated chemical at the grams per liter value provided by the recipe.
2. Use the previously recorded weight of the dyed carpet greige sample and the % of owf values for the chemicals to extend the amounts of each material required for the protective treatment bath.
3. Add the treatment bath to the flat pan applicator, be sure that the applicator is on a flat surface.
4. Immerse the carpet greige sample to be treated pile down into the applicator pan.
5. Press the carpet greige sample using the plexiglass lid to aid in leveling the treatment application. Control Treatment.
5a. After pressing the carpet greige using the plexiglass lid, spray the treatment solution for the underside onto the carpet greige to achieve 35 to 45% wpu.
6. Place the carpet greige sample with treatment applied onto the horizontal steamer tray with the pile down. Steam for 20 seconds, turn the steam valve off, remove the tray from the steamer, turn the carpet greige sample pile up, re-insert the tray into the steamer and steam for an additional twenty seconds.
7. Turn the steam valve off. Remove the treated carpet greige from the steamer and rinse the greige under running tap water for 30 seconds.
8. Place the rinsed carpet greige into the centrifuge and spin for 2 minutes.
9. Place the centrifuged carpet greige into the flow through dryer at 235° F., dry for five minutes. Remove the dried carpet greige from the dryer and allow 4 hours at room temperature conditions prior to testing.

Step 5.a is included on the test sample, so that an additional fluorochemical treatment is applied to the underside of the tufted carpet, so that a water barrier effect can be provided that would prevent liquid spills from penetrating into the layers underneath the carpet primary backing. The step was not used in the control.

The dye bath comprised:
STS—0.05 grams per liter
SHMP—0.25""
Defoamer—0.25""
DOSS 70—1.0""
Dowfax 2A1—0.4""
35% Phosphoric Acid—0.60""
Nylanthrene Orange TC 200—0.003""
Telon Red 2BN 200—0.003""
Telon Blue BRL 200—0.006""

The after treatment bath was: 400% wpu
3M FX 657 stainblocker—4.5 g/l
Daikin TG3311 fluorochemical—0.5 g/l
A-80 Acid—7 g/l
pH 1.70

The treatment bath applied to the underside of the carpet was about 40% wpu and contained:
Daikin TG 571 fluorochemical—25.0""
A-80 Acid—3""
pH—1.90

A control sample (without spraying on the underside of the primary backing) had 5 mls of tap water applied to the face side of the material. A paper towel was placed on the underside of the material, so that the moment water passed through to the towel would be evident. The water penetrated into the pile in 30 seconds, and penetrated through the material and onto the paper towel in 30 minutes.

The test sample with the fluorochemically treated underside also had 5 mls of tap water applied to the face side. The water penetrated the pile after 5 minutes, and had not penetrated onto the towel after a 24 hour period. Thus, the barrier layer provided a layer that is substantially impervious to water.

Example 2

The following greige was used in Example 2:
Greige—2188
60 oz/yd pile weight
3.32 oz/yd primary backing
24 by 13 beige polybac Amoco 2205
Honeywell T 312 Staple
$2.75/2$ count
4.5 by 4.0 twist
⅛ guage
46 stitches per 6 inches
$23/32$ inch pile height The dyeing and pile side treatments were the same as Example 1.
The treatment for the backstitch side was:
Control—no backstitch treatment
Test Sample—1.5% owf Clariant NUVA CPA fluorochemical (10% Fluorine), 1500 ppm based on total pile weight
A-80 Acid—0.24% owf, pH 1.9
40% wpu sprayed onto the backstitch side of the greige after the pile treatment was applied, then steamed for 90 seconds, rinsed, extracted, and dried.

The control and test samples were coated by hand using a 600 load precoat made using Dow 803 SBR latex, and a brown calcium carbonate filler from H&S filler company in Dalton Ga. The precoat was applied at 22 oz per yard. A six pic secondary backing was applied also, with 7 oz per yard of a 400 load adhesive applied to the secondary backing prior to adhering the secondary to the carpet/precoat structure. The assembled coated carpet samples were dried in a flow through oven for 5 minutes at 250° F. to dry the latex compound. The coated samples were then allowed to condition for 24 hours at room conditions prior to testing.

The samples were then placed on a flat table, with a paper towel underneath each sample. A 20 ml aquilot of a solution containing Acid Red 40 dye at 0.04 grams per liter was then applied to the pile side of the carpet samples. The samples were allowed to stand for 24 hours, after which they were removed and any staining on the paper towels was noted. The control sample with no backstitch treatment was heavily stained by the Acid Red 40 solution that had penetrated through the carpet structure. The sample with the back stitch treatment did not have any stain on the towel underneath, indicating no penetration of the carpet structure by the liquid staining solution. Thus, the carpet, according to the invention, is substantially impervious to this liquid penetration.

As discussed above, it has been found that application of a composition with liquid barrier properties can be successfully applied to the underside of the primary backing. One in the art would have been taught against attempting application of a barrier material to the primary backing. This is because, for example, the primary backing is perforated with many holes during the tufting operation, since the yarn bundles are pushed through the primary backing by the tufting needles. Moreover, the primary backing can be damaged to some degree during the tufting operation, so it was surprising that barrier to liquids could be accomplished using the primary backing as the application point. It was surprising therefore, to see that a liquid barrier effect is achieved when effective amounts of a repellent material are applied to the underside of the tufted carpet.

Application of an effective amount of repellent material to the underside of the tufted carpet, prior to coating the carpet, provides for a liquid barrier effect that is useful in preventing common household liquid spills from penetrating through the carpet, before there is an opportunity to clean and remove the liquid. If the liquid is allowed to penetrate through the primary backing, it can wet out the latex and weaken it, possibly leading to the delamination of the carpet. The liquid could then penetrate the latex and secondary backing areas, and penetrate into the pad and subfloor, where it is very difficult to completely dry and remove. This invention provides a method by which common spills can be contained above the primary backing layer, allowing for easy removal.

The preceding description is meant to convey an understanding of the present invention to one skilled in the art, and is not intended to be limiting. Modifications within the scope and spirit of the invention will be apparent to those skilled in the art. Therefore, the scope of the invention should be construed by reference to the appended claims.

What is claimed is:

1. A method of producing carpet, comprising the steps of:
(a) providing a carpet having a pile side formed from yarn fibers projecting through a primary backing layer, and an underside region comprising back stitch yarn fibers and the primary backing layer;
(b) applying effective repellency enhancing amounts of a first repellency enhancing compound to the pile side;
(c) applying a liquid repellency enhancing compound to the underside region to provide improved liquid barrier properties in the region; and
(d) applying separately a coating or latex layer to the underside region, wherein step (b) is performed separately from step (c).

2. The method of claim 1, wherein the underside region additionally comprises between about 1 and about 30 percent by weight of the portion of the yarn fibers closest to the primary backing.

3. The method of claim 1, further comprising the step of: (e) applying a secondary backing to said underside region by use of a latex.

4. The method of claim 1, wherein the first repellency enhancing compound is applied by immersing the carpet in an aqueous medium having a pH of less than about 3.5 and that comprises an anionic or nonionic fluorochemical compound.

5. The method of claim 4, wherein the aqueous medium is substantially free of water-soluble salt.

6. The method of claim 4, wherein the pH of the aqueous medium is between about 1 to about 2.

7. The method of claim 1, wherein the liquid repellency enhancing compound is applied by spraying, padding, or foaming onto the underside region an aqueous medium having a pH less than about 3.5 that comprises a fluorochemical compound.

8. The method of claim 1, wherein the carpet is heated after steps (b) to fix the first repellency enhancing compound and after step (c) to fix the liquid repellency enhancing compound to the carpet.

9. The method of claim 8, wherein the carpet is heated at a temperature between about 160° F. and about 260° F. for between about 15 seconds and about 60 minutes to affect the fixing.

10. The method of claim 8, wherein the carpet is heated with steam.

11. The method of claim 1, wherein the first repellency enhancing compound is applied by immersing the carpet in an aqueous medium comprising a stain resist compound.

12. The method of claim 1, wherein the underside region is treated in step (c) such that the carpet contains between about 500 ppm and about 2,500 ppm of the liquid-repellency compound based on total pile weight of the carpet.

13. The method of claim 1, wherein the yarn fibers comprise nylon fibers.

14. The method of claim 11, wherein the yarn fibers comprise nylon fibers.

15. The method of claim 1, wherein the yarn fibers comprise polypropylene fibers.

16. The method of claim 1, wherein the yarn fibers comprise polyester fiber.

17. The method of claim 1, wherein the first repellency enhancing compound is applied by immersing the carpet in an aqueous medium, comprising the first repellency enhancing compound, by use of a flex nip applicator.

18. The method of claim 1, wherein the first repellency enhancing compound is applied by immersing the carpet in an aqueous medium comprising the first repellency enhancing compound and having a pH of less than about 3.5; and step (c) comprises spraying, padding, or foaming another aqueous medium comprising the liquid repellency enhancing compound and having a pH of less than about 3.5.

19. The method of claim 1, wherein step (c) comprises application of an aqueous medium comprising the liquid repellency compound, at a wet pick up of between about 5% to about 100%.

20. The method of claim 19, wherein the first repellency enhancing compound comprises a fluorochemical compound with soil and water repellency characteristics; and the liquid repellency compound comprises a fluorocarbon with water-repellency characteristics.

* * * * *